United States Patent [19]

Jagannathan et al.

[11] Patent Number: 5,043,230
[45] Date of Patent: Aug. 27, 1991

[54] ZINC-MAGANESE ALLOY COATED STEEL SHEET

[75] Inventors: Vijay Jagannathan, Emmaus; Herbert E. Townsend, Center Valley, both of Pa.

[73] Assignee: Bethlehem Steel Corporation, Bethlehem, Pa.

[21] Appl. No.: 521,877

[22] Filed: May 11, 1990

[51] Int. Cl.$^5$ .............................................. B32B 15/00
[52] U.S. Cl. .................................. 428/655; 428/656; 428/657; 428/658
[58] Field of Search ................ 428/655, 656, 657, 658

[56] References Cited

U.S. PATENT DOCUMENTS 2,637,896  5/1953  Nachtman ............................ 428/655
4,298,661  11/1981 Ikeno et al. ......................... 428/656
4,548,868  10/1985 Yonezawa et al. ................... 428/658

OTHER PUBLICATIONS

Zinc-Manganese Alloy Electroplated Steel for Automotive Body, M. Sagiyama et al., S.A.E. Paper #860268 (1986).
Corrosion-Resistant Precoated Steel Sheets for Automotive Body Panels, T. Watanabe et al., World Materials Congress Proceedings (1988).
Electrodeposition of Zinc-Manganese on Steel Strip, M. Sagiyama et al., Plating and Surface Finishings (Nov., 1987).

Primary Examiner—R. Dean
Assistant Examiner—Robert R. Koehler
Attorney, Agent, or Firm—John I. Iverson

[57]  ABSTRACT

Disclosed is a multi-layered zinc-manganese alloy coating electrodeposited on sheet steel. The alloy layer closest to the surface of the sheet steel has a composition of at least 50% manganese while the composition of the other alloy layers farther removed from the surface of the sheet steel have less than 50% manganese.

4 Claims, 5 Drawing Sheets

Zn-Mn (43% Mn)

(PRIOR ART)

Zn-Mn (LAYERED)

(PRESENT INVENTION)

Zn-Mn (43% Mn)

(PRIOR ART)

Zn-Mn (LAYERED)

(PRESENT INVENTION)

Zn-Mn (43% Mn)

(PRIOR ART)

Zn-Mn (LAYERED)

(PRESENT INVENTION)

ZINC-MAGANESE ALLOY COATED STEEL SHEET

BACKGROUND OF THE INVENTION

This invention relates to the coating of steel sheet with a corrosion resistant nonferrous alloy. It relates particularly to a electrodeposited coating of a steel sheet with a zinc-manganese alloy.

It is well-known that steel sheet can be protected from corrosion by a nonferrous metallic coating, such as aluminum, tin or zinc. It is also well-known that alloys of nonferrous metals, such as zinc-nickel alloy or layers of different nonferrous metals, such as zinc and chromium can be used to coat steel to improve its corrosion resistance and other properties, such as paintability. Alloy coatings have wide application in the automotive industry to protect automotive components from corrosion.

Zinc-manganese alloy coatings have been electroplated on steel sheet with generally good results. A process for electroplating steel sheet with a single layer of zinc-manganese alloy coating is described in a paper entitled "Electrodeposition of Zinc-Manganese on Steel Strip" by M. Sagiyama, et al., appearing in the November, 1987 issue of *Plating and Surface Finishing*. Society of Automotive Engineers Paper No. 860268 (1986) entitled "Zinc-Manganese Alloy Electroplated Steel for Automotive Body" by M. Sagiyama, et al., further describes the properties of a single layer zinc-manganese alloy coating on sheet steel for automotive applications.

These papers describe that single layer zinc-manganese coatings (30–50%) manganese have good corrosion resistance, both before and after painting.

One problem with many nonferrous alloy coatings is the tendency of such coatings to "powder" when the coated steel sheet is being formed or fabricated. Powdering is characteristic of a number of coatings in which portions of the coating crack and flake off the surface of the coated steel sheet during the stamping or forming of the coated sheet. Not only does this result in a partial loss of the protective coating and possibly tiny cracks in the coating, but also the "powder" tends to buildup in the dies used during the stamping or forming of the coated sheet. The accumulated powder in the dies can then cause imperfections in parts subsequently stamped or formed.

SUMMARY OF THE INVENTION

It is an object of this invention to provide a coated steel sheet having good corrosion resistance, good paintability and good formability with a high resistance to powdering during a stamping or forming operation.

It is a further object of this invention to provide a unique coated steel sheet that can be easily produced using conventional electrodeposition equipment and facilities.

It has been discovered that the foregoing objectives can be attained by a steel sheet coated with a plurality of layers of a zinc-manganese alloy, with the layer or layers adjacent to the steel surface having a higher manganese content than the layer or layers further away from the steel surface.

DESCRIPTION OF A PREFERRED EMBODIMENT

Steel sheet coated with zinc alloys provides good corrosion resistance, weldability, paintability and mechanical properties. Zinc-iron and zinc-nickel alloys are two of the zinc alloys that are being used commercially for automotive components. Another zinc alloy being developed as a coating for steel sheet is a zinc-manganese alloy. This alloy can be electrodeposited on steel sheet using conventional electroplating equipment and a plating solution of zinc sulfate and manganese sulfate. To co-deposit both zinc and manganese, the deposition potential of zinc must be displaced by that of manganese. An additive, such as sodium citrate is added to the plating solution to displace the deposition potential of the most noble metal (zinc) to that of the less noble metal (manganese).

A laboratory investigation was conducted to produce and evaluate samples of cold-rolled steel sheet which was electroplated with a zinc-manganese alloy coating. The steel used was cold-rolled, low carbon, aluminum killed steel sheet approximately 0.7 mm thick. The samples were electroplated using a rotary cathode electroplating equipment and the following composition of the plating solution:

TABLE I

| COMPOSITION OF PLATING SOLUTION | |
|---|---|
| Constituent | Concentration (mol/L) |
| $ZnSO_4.7H_2O$ | 0.24 |
| $MnSO_4.H_2O$ | 0.18 |
| $Na_3C_6H_5O_7.2H_2O$ | 0.612 |

The plating parameters and operating conditions are listed in TABLE II.

TABLE II

| ELECTROPLATING PROCESS SPECIFICS | | |
|---|---|---|
| Substrate: | DQSK cold-rolled steel, 0.7 mm thick | |
| Electrolyte: | $ZnSO_4.7H_2O$ | 70 g/l. |
| | $MnSO_4.H_2O$ | 40 |
| | $Na_3C_6H_5O_7.2H_2O$ | 180 |
| pH: | 5.4 at 50° C. | |
| Temperature: | 50° C. | |
| Current Density: | 27 A/sq.dm | (250) ASF |
| Anode: | Insoluble (Pt coated Nb) | |
| Rotation Speed: | (a) Varied from 50–300 rpm. | |
| | (b) 200 rpm to produce Zn—Mn coating ~40 wt % Mn. | |
| | (c) Varied from 150 to 250 rpm in steps of 50 rpm during plating to produce a | |

TABLE II-continued
ELECTROPLATING PROCESS SPECIFICS
layered coated product.

This investigation had three objectives. The first was to produce a zinc-manganese coated steel sheet according to the prior art described in the literature; "Zinc-Manganese Alloy Electroplated Steel for Automotive Body", *Society of Automotive Engineers Paper No. 860268* by M. Sagiyama, et al. (1986); "Electrodeposition of Zinc-Manganese on Steel Strip" by M. Sagiyama, et al., appearing in the November, 1987 issue of *Plating and Surface Finishing*. The optimum zinc-manganese coating according to the above prior art is a single layer coating of 40-50% manganese, balance zinc.

Figure 1A:
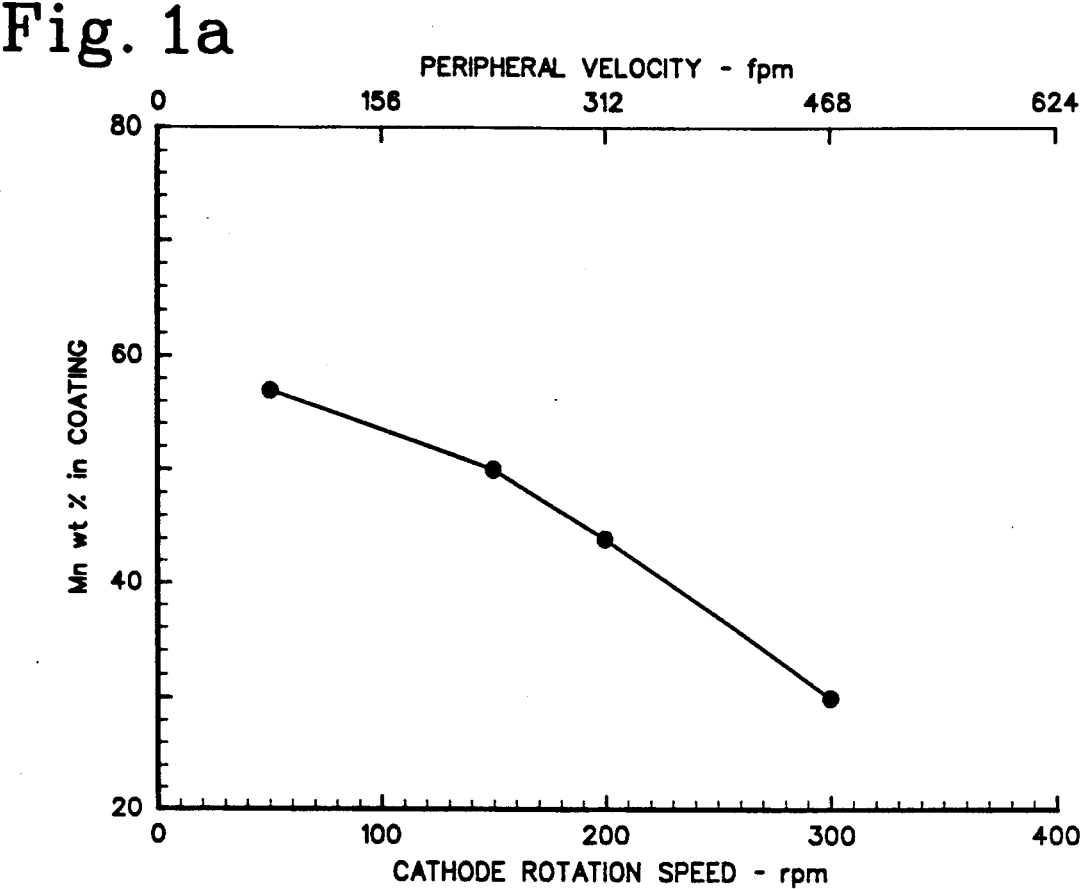
FIGS. 1(a) and 1(b) are graphs showing the electroplating process results of samples of coated steel sheet prepared according to this invention.
Figure 1B:
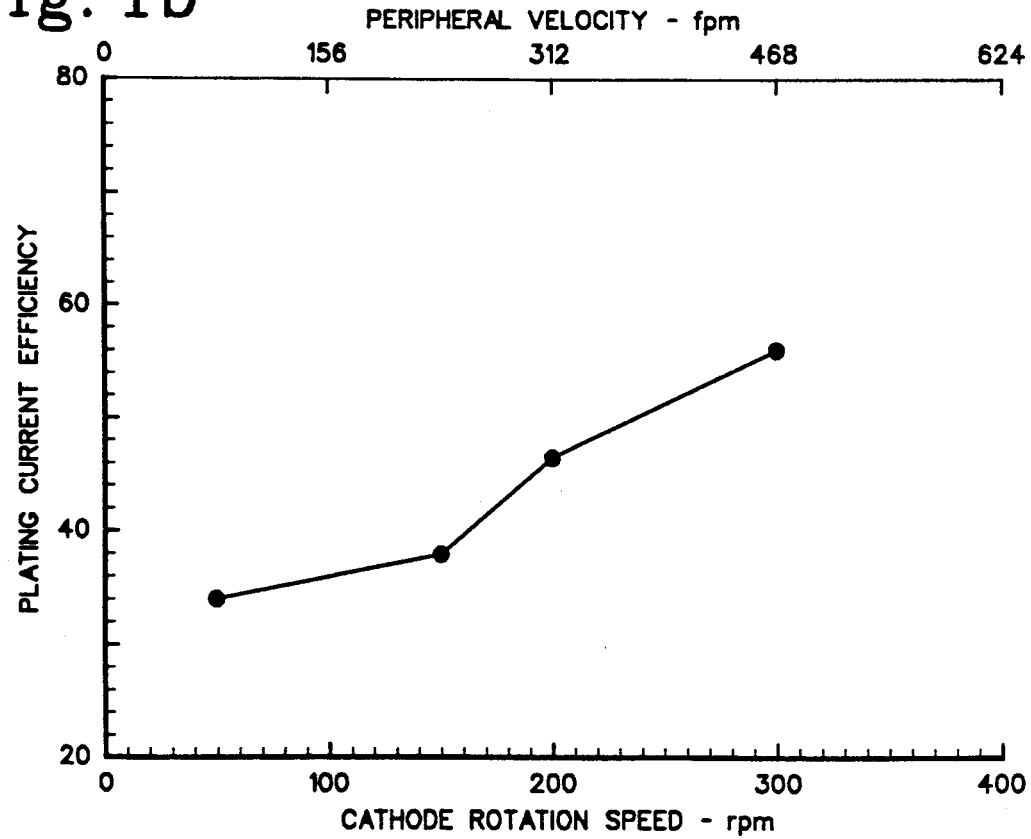

The second objective was to investigate the effect of varying plating solution velocity conditions on the coating composition and plating efficiency. The cathode rotation rate was varied from 50-300 rpm. The variation in coating composition and plating efficiency are plotted as a function of the cathode rotation rate in FIGS. 1(a) and 1(b). In general, it is to be noted that the observed cathode efficiencies were very low, the highest being about only 60%. Efficiencies could possibly be increased to about 80% by suitable bath additions.

The third objective was to study the effect of a multi-layered coating on product properties. From past work, composition layering of the coating can be achieved since the coating composition has been shown to be sensitive to plating solution flow conditions. This is clearly shown in FIG. 1(a) which presents the results of varying electrolyte flow rate on the composition of the zinc-manganese electrodeposited coating. It was decided to intentionally produce a multi-layered zinc-manganese coating in the laboratory to study the effect of such a layered coating on the corrosion and powdering properties of the coated steel sheet. To achieve this multi-layered coating, the cathode rotation rate was changed in a stepped manner from 150 to 200 to 250 rpm during electroplating. The choice of rotation (flow) rates was based on data in FIG. 1(a). This produced a coating with three distinct layers with the layer closest to the steel having the highest manganese content. This multi-layered coating had an overall average manganese content of 40 wt % manganese.

After the samples were prepared, an evaluation of the coating structure and its powdering and corrosion properties of the prior art (single layer, 43% manganese) and the multi-layered (average 40% manganese) zinc-manganese coatings was conducted.

All the zinc-manganese coatings produced were analyzed for the manganese content by atomic absorption spectroscopy, and all the compositions reported are by such an analysis unless otherwise indicated.

Figure 2A:
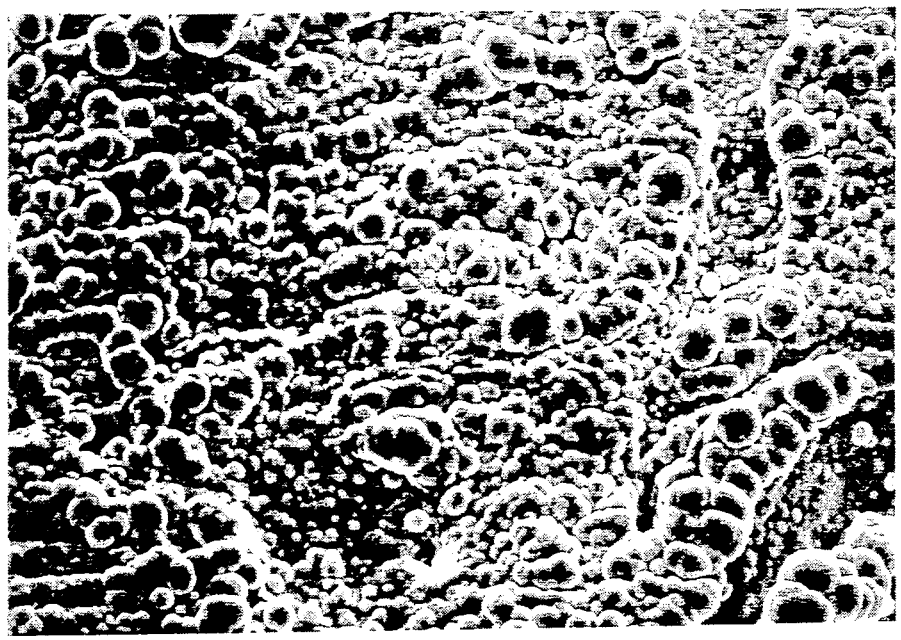
FIGS. 2(a) and 2(b) are photomicrographs showing the product surface morphology of steel sheet coated according to the prior art and to this invention.
Figure 2B:
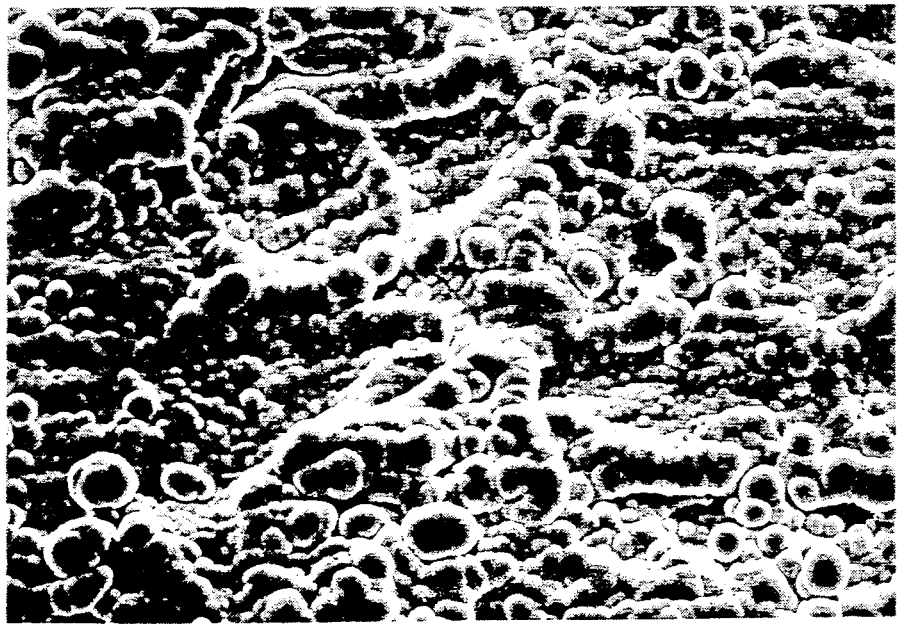

The surface of the plated products were examined by scanning electron microscopy (SEM) and the results are shown in FIGS. 2(a) and 2(b). The zinc-manganese alloy is seen to deposit in nodular form. The size and distribution of the nodules seem to vary with the manganese content of the deposit. This is visible to a certain extent in FIGS. 2(a) and 2(b) where (a) is the structure of a single layer 43% Mn deposit according to the prior art and (b) is the structure of the outer surface layer of the multi-layer deposit according to this invention, this surface layer containing about 35% Mn.

Figure 3A:
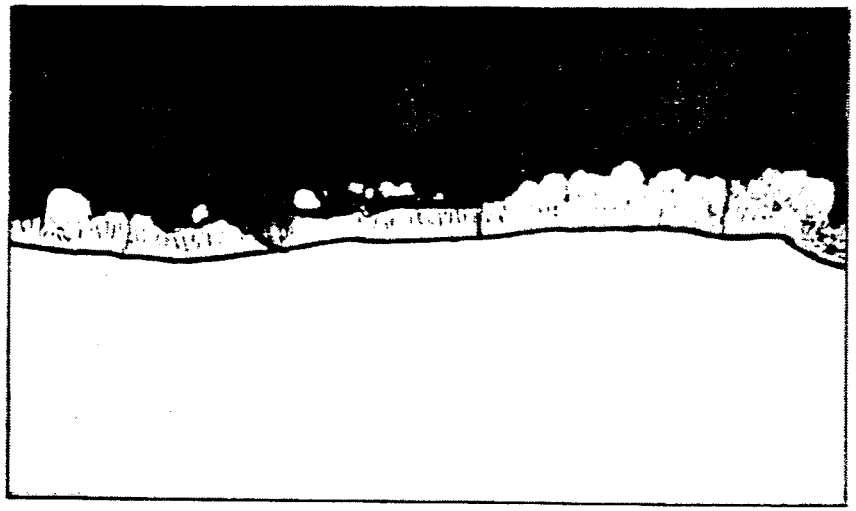
FIGS. 3(a) and 3(b) are photomicrographs of a cross section of steel sheet coated according to the prior art and to this invention.
Figure 3B:
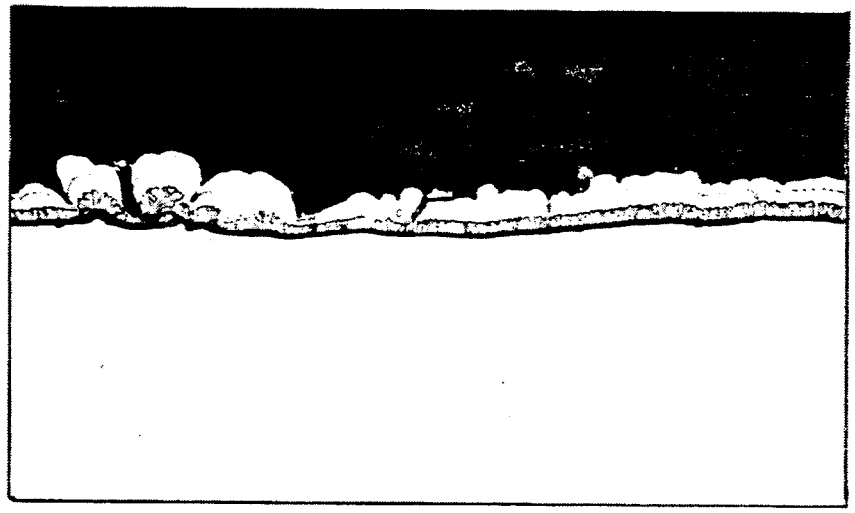
Figure 4A:
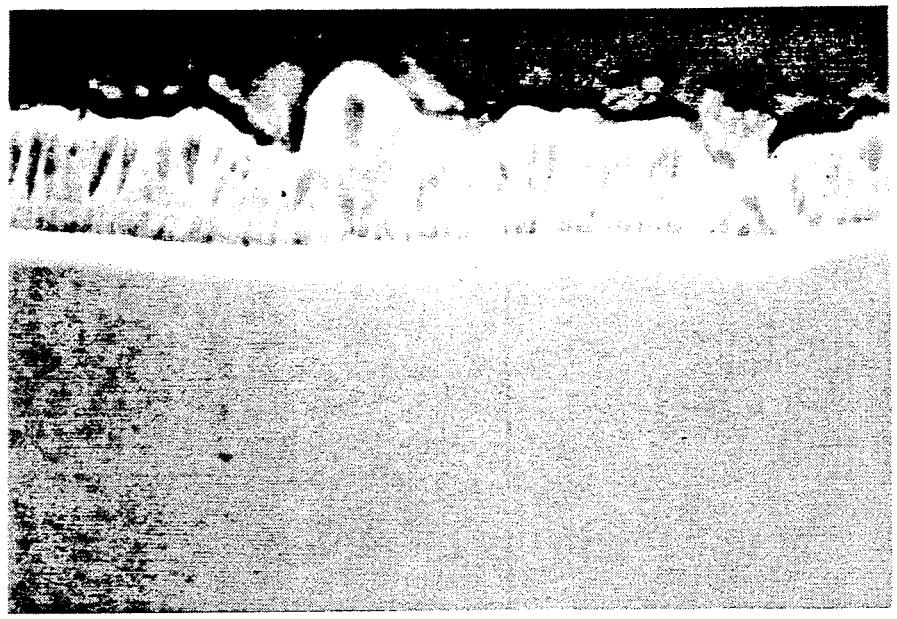
FIGS. 4(a) and 4(b) are SEM photomicrographs of a cross section of steel sheet coated according to the prior art and to this invention.
Figure 4B:
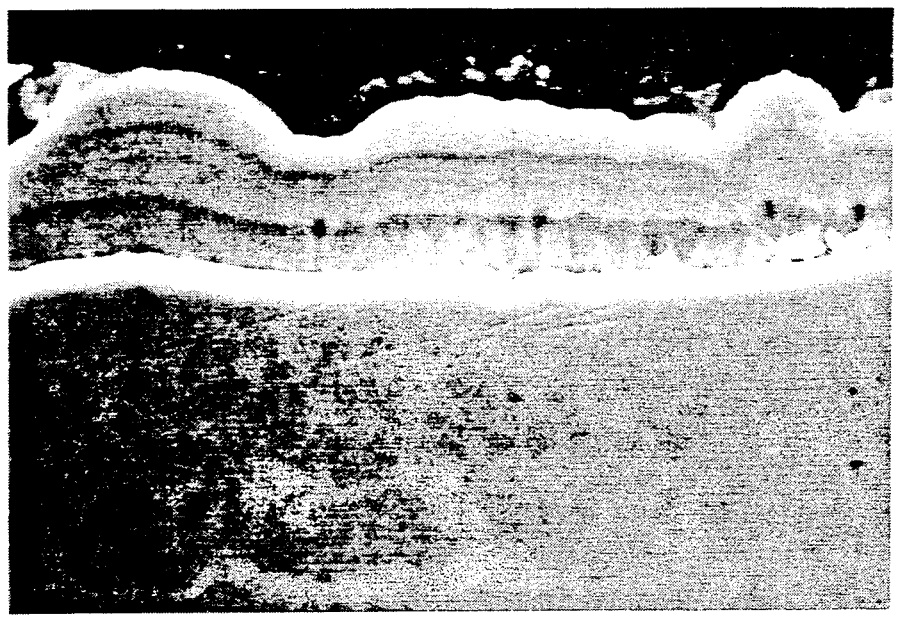

Cross sectional examination of the deposits were carried out by optical metallography and by SEM observation. All the coatings appear to have striations which also seem to be an outcome of the nodular growth pattern (FIGS. 3, 4(a) and 4(b)). In addition to the striations, the layered coating did show three distinct layers. On semi-quantitative SEM-EDS analysis, the three layers were seen to contain varying Mn contents as expected, with the layer closest to the steel containing 55% manganese, the middle layer, 45% manganese and the surface layer 32% manganese. What appears to be porosity is also observed in the cross sectional micrographs. X-ray diffraction revealed the presence of the $\gamma$ and the $\epsilon$ phases in the single layer (43% manganese) deposit of the prior art. The multi-layer coating, however, indicated the presence of only the $\epsilon$ phase, which is a characteristic of a low manganese content coating.

Samples of the single layer (43% manganese) coated sheet of the prior art and the multi-layer (55%, 45%, 32% manganese) coated sheet of this invention were then subjected to the following test.

A. Powdering Test

This test is conducted as follows:

Materials are cut to $3'' \times 4''$ pieces and vapor degreased. The mass of each piece is recorded before testing. A $\frac{7}{8}''$ ram ball in a $1''$ die is used to form an Olsen dimple $0.310''$ high with the coated side against the ball in an Olsen testing machine. The sample is then reversed and centered in the die such that the coated side of the dimple is away from the ram ball. The Olsen dimple is reversed to a height of $0.275''$ with the ball and die as before. Scotch brand tape #610 is then applied on the coated side of the reverse dimple by means of a rubber stopper with a pressure of 200 psi in a hydraulic press, and peeled to remove any loose or powdered coating from the dimple. The taping and removal is repeated once more to ensure removal of all traces of powdered coating. The sample is vapor degreased and reweighed to measure the mass loss which is the result of coating powdering during testing.

Figure 5:
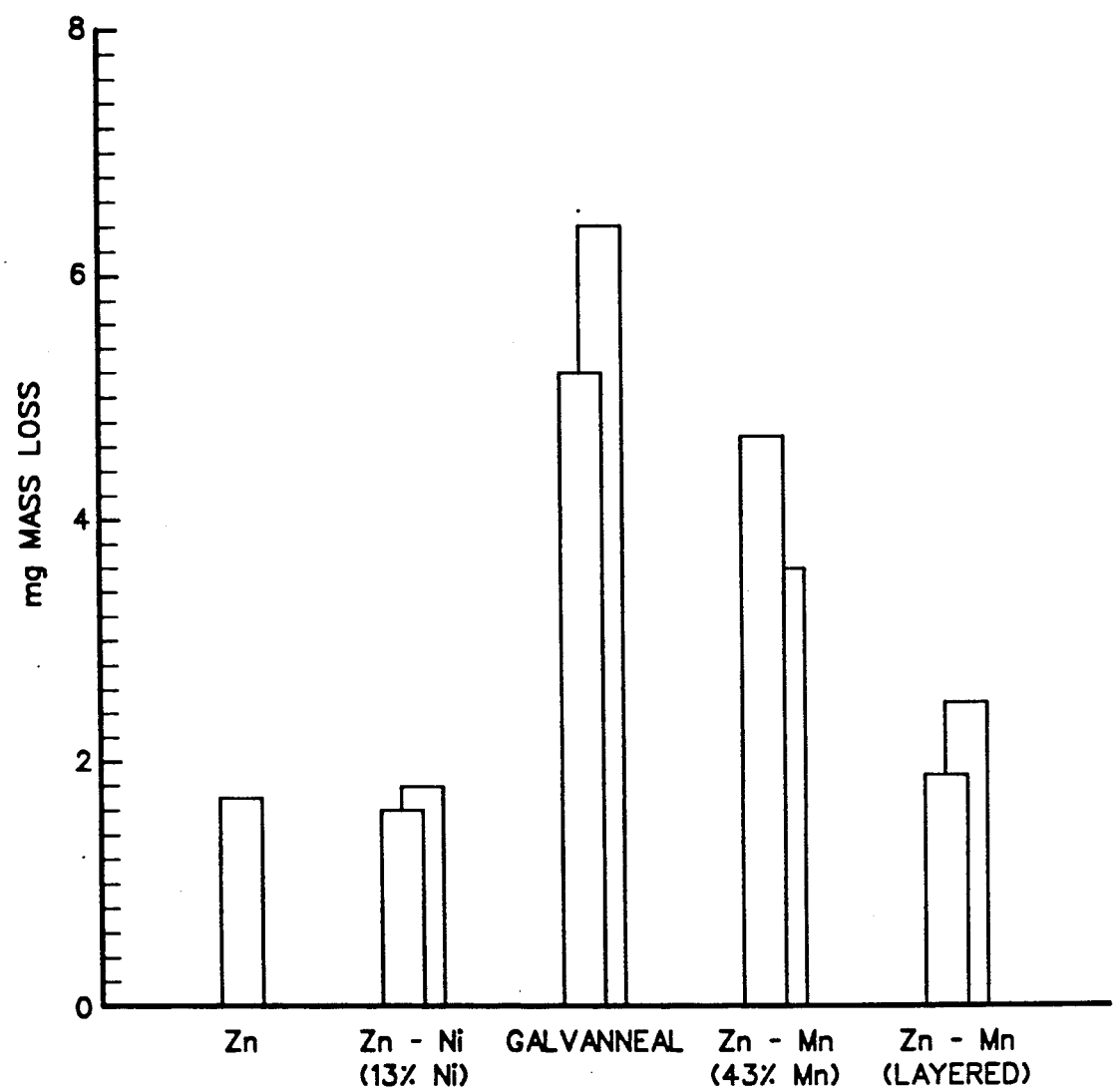
FIG. 5 is a bar graph showing the powdering loss during forming of steel sheet coated according to the prior art and to this invention.

Reverse Olsen cupping was performed on the single layer and multi-layer samples and the mass loss was recorded as powdering as per the above procedure. FIG. 5 above shows the results of two tests on each coating, and results from samples of zinc and zinc-nickel and a commercial galvanneal (iron-zinc) coated sheet are for comparison. As shown in FIG. 5, the powdering mass loss is low for the zinc-manganese coatings, especially when compared to the commercial galvanneal (Fe/Zn) coating. As shown in FIG. 5, the multi-layer zinc-manganese coatings performed significantly better in the powdering test than the single layer zinc-manganese coating of the prior art. This powdering property improvement in the multi-layer coatings is not fully understood. It is possible that the lower manganese containing outer layers, being more ductile, could be the reason for the observed lower powdering in the multi-layer coating. The presence of internal interfaces between layers could also be a contributing factor in preventing cracking and powdering of the coating. Further study is required to fully understand the mechanism for this improvement over the prior art single layer zinc-manganese coatings.

B. Scab/Chipping Corrosion Test

This test is conducted as follows:

Samples are cut to 4"×12" and painted with a typical automotive paint system. The top half of each painted sample is scribed with a sharp tool to simulate a scratch in the paint. The bottom half of each panel is used for periodic shot blasting during the test to simulate stone chipping during service. The corrosion testing of these panels is carried out in accordance with the GM Fisher Body Specification TM 54-26 (6/8/84), and the shot blasting in accordance with the Chrysler High Temperature Chipping Test as per 11/18/87 SAE/ACAP Div. 3 subcommittee meeting. The essential details of the test involve exposing the samples to a humid environment in a test chamber, with periodic cycles of immersion in salt solution, exposure to freezing conditions and oven drying (thawing). The test is carried out for a period of five weeks at the end of which the samples are analyzed for the amount of corrosion creepback from the scribe, and the damage to the shot blasted area.

The results of the Scab/Chipping Corrosion Test are summarized in TABLE III. Results of the same test on laboratory plated zinc, zinc-nickel and commercially available galvanneal (iron-zinc) are also included in for comparison.

TABLE III

SCAB/CHIPPING CORROSION TEST RESULTS

| Sample | Scribe Creep mm (¼ avg) | ±SD | GM Rating | Chipping Area % Area Damage | Red Rust Onset (10%) Cycles | Cycles to 100% RR | Bleeding 1 = No Bleed |
|---|---|---|---|---|---|---|---|
| Zn—Mn Single Layer++ 43% Mn | | | | | | | |
| (1) | 0.80 | 0.84 | 8 | 1.0 | * | * | 1 |
| (2) | 1.20 | 1.90 | 7 | 30.0 | * | * | 1 |
| (3) | 0.85 | 0.67 | 8 | 17.0 | * | * | 1 |
| Zn—Mn+++ Multi-Layered | | | | | | | |
| (1) | 0.85 | 0.67 | 8 | 7.0 | * | * | 1 |
| (2) | 0.65 | 0.82 | 8 | 1.0 | * | * | 1 |
| (3) | 1.15 | 0.94 | 7 | 2.0 | * | * | 1 |
| Zn | 2.2 | 3.47 | 6 | 5.0 | 19 | + | 2 |
| Zn—Ni (13% Ni) | 0.60 | 0.92 | 8 | 0.8 | 7-8 | + | 3 |
| Galvanneal | 0.90 | 0.79 | 8 | 1.5 | 6 | 20 | 2 |

* No red rust or staining was observed.
+ Less than 100% red rust at completion of 25 test cycles.
++ Coating weight ≈43 g/m²
+++ Coating weight ≈41 g/m²

The main observation with the zinc-manganese coatings was the formation of a black corrosion product which appeared to have corrosion protective ability. As a result, no red rust or red rust bleeding was seen on the zinc-manganese coated panels. The scribe creep resistance was better than pure zinc coatings but the panels seemed to suffer more paint damage in the gravelometer chipping area. The exact composition or structure of the black, adherent corrosion product layer was not analyzed, but could very well be the $\gamma$-$Mn_2O_3$ layer.

It is within the scope of this invention that the zinc-manganese multi-layered coating could be two layers, three layers or even more layers. It is important that the manganese content in the layer closest to the surface of the steel sheet be at least 50% manganese and less in the outer layer or layers. As indicated in this test, a preferred coating of this invention would be a three-layered coating of about 55% manganese in the layer closest to the surface of the steel sheet, about 45% manganese in the next layer and about 30-35% manganese in the outermost layer. It is preferred that all layers be approximately the same thickness.

We claim:

1. A steel sheet coated with a plurality of layers of a zinc-manganese alloy, the alloy layer adjacent to the steel surface having a higher manganese content than the layer or layers further away from the steel surface.

2. The steel sheet of claim 1 in which the composition of the alloy adjacent the steel surface is at least 50% manganese.

3. The steel sheet of claim 1 in which the number of alloy layers is three.

4. A steel sheet coated with three layers of a zinc-manganese alloy, the alloy layer adjacent to the steel surface having a composition of at least 50% manganese and the composition of each of the other two layers being less than 50% manganese.

* * * * *